(12) United States Patent
Tsuchida et al.

(10) Patent No.: US 12,542,057 B2
(45) Date of Patent: Feb. 3, 2026

(54) VEHICLE CONTROL APPARATUS

(71) Applicants: DENSO CORPORATION, Kariya (JP); TOYOTA JIDOSHA KABUSHIKI KAISHA, Toyota (JP)

(72) Inventors: Norio Tsuchida, Tokyo (JP); Kohei Tochigi, Toyota (JP); Masahiko Adachi, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 18/429,204

(22) Filed: Jan. 31, 2024

(65) Prior Publication Data

US 2024/0169834 A1     May 23, 2024

Related U.S. Application Data

(63) Continuation of application No. PCT/JP2022/026690, filed on Jul. 5, 2022.

(30) Foreign Application Priority Data

Aug. 2, 2021   (JP) .................. 2021-126946

(51) Int. Cl.
*G08G 1/0967*     (2006.01)
*G06T 7/13*       (2017.01)
(Continued)

(52) U.S. Cl.
CPC ......... *G08G 1/096725* (2013.01); *G06T 7/13* (2017.01); *G06T 7/64* (2017.01); *G06T 7/70* (2017.01); *G06T 7/90* (2017.01); *G06V 20/584* (2022.01); *G06V 20/588* (2022.01); *G08G 1/0125* (2013.01); *G08G 1/09623* (2013.01); *G06T 2207/10024* (2013.01); *G06T 2207/30256* (2013.01); *G06T 2207/30264* (2013.01)

(58) Field of Classification Search
None
See application file for complete search history.

(56) References Cited

U.S. PATENT DOCUMENTS 8,340,896 B2 * 12/2012 Saito ................. G01S 11/12
382/104
11,273,825 B2 * 3/2022 Yanagihara ..... B60W 30/18159
(Continued)

FOREIGN PATENT DOCUMENTS

JP      2010224925 A    10/2010
JP       201532179 A     2/2015
(Continued)

*Primary Examiner* — Todd Melton
(74) *Attorney, Agent, or Firm* — Maschoff Brennan

(57) ABSTRACT

A vehicle control apparatus recognizes traffic conditions ahead of an own vehicle based on an image captured by a camera that captures an area ahead of the own vehicle. The vehicle control apparatus includes a detection area setting unit and a selecting unit. The detection area setting unit sets a traffic light detection area in which a traffic light present ahead of the own vehicle is detected in the image, based on a form of a road. The selecting unit that selects a target traffic light to be obeyed by the own vehicle from traffic lights detected in the traffic light detection area.

20 Claims, 5 Drawing Sheets

(51) Int. Cl.
*G06T 7/64* (2017.01)
*G06T 7/70* (2017.01)
*G06T 7/90* (2017.01)
*G06V 20/56* (2022.01)
*G06V 20/58* (2022.01)
*G08G 1/01* (2006.01)
*G08G 1/0962* (2006.01)

(56) References Cited

U.S. PATENT DOCUMENTS

| | | |
|---|---|---|
| 2015/0039212 A1 | 2/2015 | Kido |
| 2018/0150705 A1 | 5/2018 | Yamanoi et al. |
| 2021/0027076 A1 | 1/2021 | Hayashi et al. |

FOREIGN PATENT DOCUMENTS

| | | |
|---|---|---|
| JP | 6447722 B2 | 1/2019 |
| JP | 202118737 A | 2/2021 |

\* cited by examiner

VEHICLE CONTROL APPARATUS

CROSS-REFERENCE TO RELATED APPLICATION

The present application is a continuation application of International Application No. PCT/JP2022/026690, filed on Jul. 5, 2022, which claims priority to Japanese Patent Application No. 2021-126946, filed on Aug. 2, 2021. The contents of these applications are incorporated herein by reference in their entirety.

BACKGROUND

The present disclosure relates to a vehicle control apparatus. A technology is known for recognizing traffic conditions ahead of an own vehicle based on images captured by a camera that captures an area ahead of the own vehicle.

SUMMARY

One aspect of the present disclosure is a vehicle control apparatus that recognizes traffic conditions ahead of an own vehicle based on an image captured by a camera that captures an area ahead of the own vehicle. The vehicle control apparatus sets a traffic light detection area in which a traffic light present ahead of the own vehicle is detected in the image, based on a form of a road, and selects a target traffic light to be obeyed by the own vehicle from traffic lights detected in the traffic light detection area.

DESCRIPTION OF EMBODIMENTS

Figure 1:
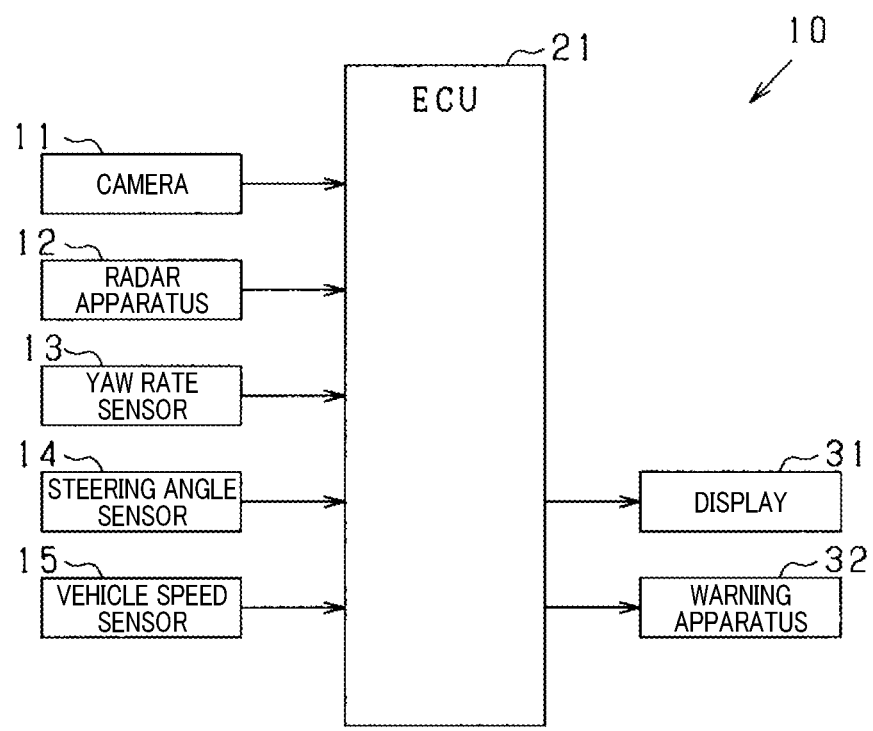
FIG. 1 is a diagram illustrating an overall configuration of a driving assistance apparatus.

A technology for recognizing traffic conditions ahead of an own vehicle based on images captured by a camera that captures an area ahead of the own vehicle is known. For example, JP 6447722 B2 discloses a technology in which a traffic light is detected from at least either of a narrow-angle image captured by a narrow-angle camera and a wide-angle image captured by a wide-angle camera.

Here, a road on which a vehicle travels can take various forms. A target traffic light to be obeyed by the own vehicle is preferably recognized from an image captured by a camera while taking into consideration the form of the road at the time. In this regard, it is thought that there is still room for improvement. In addition, in cases in which a plurality of traffic lights are captured in an image, the traffic light that is the target traffic light is preferably appropriately recognized.

It is thus desired to provide a vehicle control apparatus that is capable of appropriately recognizing a target traffic light to be obeyed by an own vehicle.

An exemplary embodiment of the present disclosure provides a vehicle control apparatus that recognizes traffic conditions ahead of an own vehicle based on an image captured by a camera that captures an area ahead of the own vehicle, the vehicle control apparatus including: a detection area setting unit that sets a traffic light detection area in which a traffic light present ahead of the own vehicle is detected in the image, based on a form of a road; and a selecting unit that selects a target traffic light to be obeyed by the own vehicle from traffic lights detected in the traffic light detection area.

The traffic light detection area is set ahead of the own vehicle in the image captured by the camera, based on the form of the road. The target traffic light to be obeyed by the own vehicle is selected from the traffic lights detected in the traffic light detection area. In this case, the traffic light detection area can be appropriately set while taking into consideration the form of the road at each time. Furthermore, the target traffic light can be accurately recognized from the traffic lights captured in the image.

In the above-described exemplary embodiment, the vehicle control apparatus may further include: a recognizing unit that recognizes a road extension direction from road shape information on the area ahead of the own vehicle; an estimating unit that estimates a turn radius during vehicle turning based on a traveling speed and a yaw rate of the own vehicle; and a curve direction determining unit that determines whether directions of left/right curves of a road extension area and a turn radius area are the same, the road extension area being set using the road extension direction recognized by the recognizing unit as the curved road information, the turn radius area being set using the turn radius estimated by the estimating unit as the curved road information.

In this configuration, the detection area setting unit may (i) set the traffic light detection area to an area including a first detection area prescribed in a linear shape ahead of the own vehicle on a front side of the own vehicle, and a second detection area prescribed ahead of the own vehicle based on curving of a curved road based on curved road information, and (ii) set the second detection area based on at least either of the road extension area and the turn radius area. The selecting unit may not select the traffic light detected in only the first detection area of the first detection area and the second detection area as the target traffic light, in response to the directions of the left/right curves of the road extension area and the turn radius area being determined to be the same.

In the above-described exemplary embodiment, the vehicle control apparatus may further include: a road edge detecting unit that detects, of left and right road edges in a road-width direction, the road edge on the opposite-direction roadway side as a detected road edge.

In this configuration, the detection area setting unit may (i) set an area including a forward-direction roadway of which a travel-permitted direction is identical to an advancing direction of the own vehicle and an opposite-direction roadway of which the travel-permitted direction is an opposite direction of the forward-direction roadway on a road on which the own vehicle is traveling as a lateral width of the traffic light detection area, (ii) in response to a distance from the own vehicle to the detected road edge being shorter than a predetermined distance, consider the detected road edge to be a median strip, and sets the lateral width of the traffic light detection area such that a road width is expanded further beyond the detected road edge, and (iii) in response to the distance from the own vehicle to the detected road edge being longer than the predetermined distance, set the lateral width of the traffic light detection area without expanding the road width.

In the above-described exemplary embodiment, in response to the target traffic light being lost in a state in which the target traffic light is selected within an intersection, the selecting unit may not select, among the remaining traffic lights detected within the same intersection, the traffic light of which the display color differs from that of the lost target traffic light and a distance in a lateral direction to the own vehicle is equal to or greater than a predetermined distance, as the target traffic light.

In the above-described exemplary embodiment, the vehicle control apparatus may further include: a state determining unit that determines that the own vehicle is in a state of being in a parking area. In this configuration, in response to the state determining unit determining that the own vehicle is in the state of being in a parking area, the selecting unit may not perform selection of the target traffic light.

The above-described exemplary embodiment of the present disclosure will be further clarified through the detailed description below, with reference to the accompanying drawings.

First Embodiment

An embodiment in which a vehicle control apparatus of the present disclosure is applied to a driving assistance apparatus 10 that is mounted in a vehicle will hereinafter be described with reference to the drawings.

As shown in FIG. 1, the driving assistance apparatus 10 according to the present embodiment includes a camera 11, a radar apparatus 12, and an electronic control unit (ECU) 21 serving as the vehicle control apparatus.

The camera 11 is a monocular camera. For example, the camera 11 may be attached to each of a front end, a rear end, and both side surfaces of an own vehicle, and captures images of an own vehicle periphery. The camera 11 transmits image information of captured images that have been captured to the ECU 21. The camera 11 may also be a compound-eye camera.

The radar apparatus 12 is a distance measurement apparatus that uses millimeter-wave band, high-frequency signals as transmission waves. For example, the radar apparatus 12 is mounted in each of the front end, the rear end, and both side surfaces of the own vehicle, and measures a distance to an object in the own vehicle periphery. Specifically, the radar apparatus 12 transmits probe waves at a predetermined cycle and receives reflected waves by a plurality of antennas. A plurality of detection points on an object are detected based on a transmission time of a probe wave and a reception time of a reflected wave, and the distance to the object is thereby measured. In addition, an orientation of the object is calculated based on a phase difference in the reflected waves received by the plurality of antennas. If the distance to the object and the orientation of the object is calculated, a relative position of the object to the own vehicle can be identified.

Furthermore, the radar apparatus 12 calculates a relative speed of the object based on a frequency of the reflected wave of the object that has been changed by the Doppler effect. As a result, the object present in the own vehicle periphery is detected as being a stationary object or a moving object. Specifically, when a sum of the relative speed of the object and an own vehicle speed that is a vehicle speed of the own vehicle is zero, the object is detected as being a stationary object. When the sum of the relative speed of the object and the own vehicle speed is not zero, the object is detected as being a moving object. The radar apparatus 12 transmits detection information on stationary objects and moving objects in the own vehicle periphery to the ECU 21.

The ECU 21 is a control apparatus that includes a known microcomputer composed of a central processing unit (CPU), a read-only memory (ROM), a random access memory (RAM), a flash memory, and the like. The ECU 21 acquires various signals and performs various types of control based on the acquired information.

The ECU 21 detects an object in the own vehicle periphery based on a captured image of the camera 11. Specifically, the ECU 21 calculates a relative position to the own vehicle of each object appearing in the captured image of the camera 11. The objects to be detected include moving objects such as other vehicles, pedestrians, bicycles, and the like in the own vehicle periphery, and fixed objects such as traffic lights, curbstones, guardrails, and the like provided in a road periphery. In addition, the ECU 21 recognizes boundary line information related to boundary lines on a road on which an own vehicle VE is traveling based on the captured image of the camera 11. Specifically, the ECU 21 recognizes presence/absence of white lines and the like as boundary lines, and recognizes forms thereof (specifically, type, position, width, length, curvature, and the like of the boundary line). In addition to boundary lines, stop lines, pedestrian crossings, road surface arrows, and the like can be given as those that are detected as road markings on a road.

The ECU 21 performs various types of control based on detection information on objects in the own vehicle periphery transmitted from the radar apparatus 12 and detection information on objects in the own vehicle periphery detected from the captured images by the camera 11. For example, based on the detection information, the ECU 21 displays information issuing an alert for a traffic light detected from the captured image by the camera 11 in a display 31 provided in an instrument panel or the like inside a vehicle cabin, or operates a warning apparatus 21 that gives audible notification, such as a speaker or a buzzer, set inside the vehicle cabin.

In addition, a yaw rate sensor 13, a steering angle sensor 14, and a vehicle speed sensor 15 are connected to the ECU 21. The yaw rate sensor 13 is, for example, provided in a center position of the own vehicle and outputs a signal indicating a yaw rate based on a speed of change in a steering amount of the own vehicle to the ECU 21. The steering angle sensor 14 is, for example, attached to a steering rod of the vehicle and outputs a signal indicating a steering angle based on an amount of change in a steering angle of a steering wheel accompanying an operation by a driver to the ECU 21. The vehicle speed sensor 15 is, for example, attached to a wheel portion of the own vehicle, and detects a rotation direction of a wheel and outputs a vehicle speed signal based on a wheel speed to the ECU 21.

Here, the road on which a vehicle travels can take various forms. A target traffic light to be obeyed by the own vehicle is preferably recognized from an image captured by the camera 11 while taking into consideration the form of the road at the time. In addition, in cases in which a plurality of traffic lights are captured in an image, the traffic light that is the target traffic light is preferably appropriately recognized. Based on such ideas, the ECU 21 that is the vehicle control apparatus according to the present embodiment sets, in the image captured by the camera 11, a traffic light detection area RX in which a traffic light present ahead of the own vehicle is detected based on the form of the road. The ECU 21 then selects the target traffic light to be obeyed by the own vehicle from the traffic lights detected in the traffic light detection area RX.

The setting of the traffic light detection area RX will be described. Here, according to the present embodiment, left-hand traffic in which vehicles (automobiles) travel on the left side of the road is assumed. The left side of the road is a forward direction and the right side is an opposite direction. That is, a left roadway on the left side of the road is a forward-direction roadway in which a travel-permitted direction is the same as an advancing direction of the own vehicle. A right roadway on the right side of the road is an opposite-direction roadway in which the travel-permitted direction is a direction opposite that of the forward-direction roadway.

The traffic light detection area RX is an area in which a direction ahead of the own vehicle in the advancing direction is a vertical direction and a road-width direction (left/right direction) is a lateral direction. The traffic light detection area RX is successively (repeatedly) set during vehicle travel. Hereafter, of setting of the vertical direction and setting of the lateral direction of the traffic light detection area RX, the setting of the vertical direction will be described first. According to the present embodiment, as shown in FIG. 2, the traffic light detection area RX is set to an area that includes a first detection area R1 prescribed in a linear shape on a front side of the own vehicle VE and a second detection area R2 prescribed based on curving of a road 100 (curved road).

Figure 2:
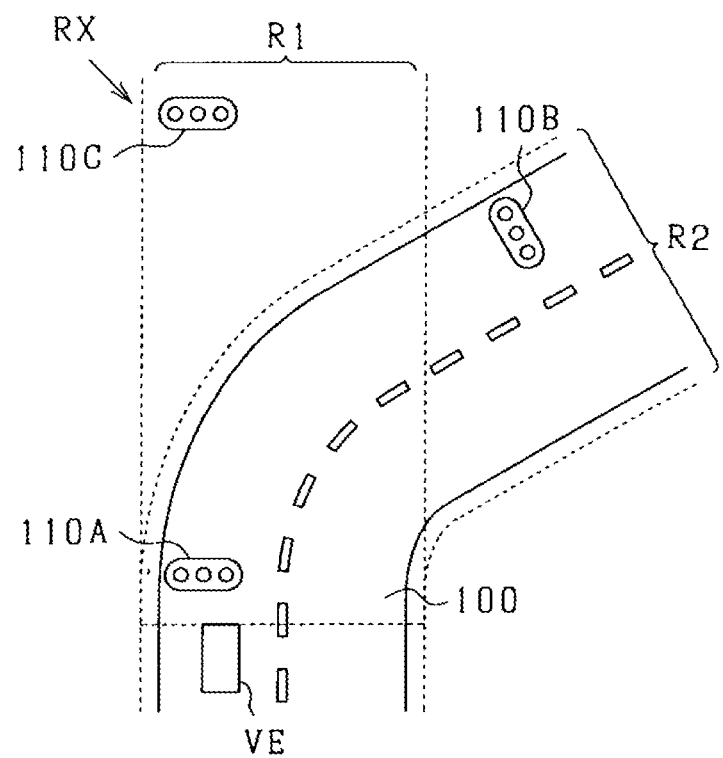
FIG. 2 is a diagram illustrating a traffic light detection area.

FIG. 2 shows a state in which the road 100 is a curved road and the own vehicle VE is traveling in a linear portion before reaching a corner portion of the road 100. In this case, the ECU 21 sets the linear-shaped first detection area R1 ahead of the own vehicle VE, on the front side of the own vehicle VE based on an orientation of the own vehicle VE. In addition, the ECU 21 sets the second detection area R2 ahead of the own vehicle VE based on the curving of the curved road based on curved road information on the road 100. The area including the detection areas R1 and R2 is the traffic light detection area RX.

Figure 3A:
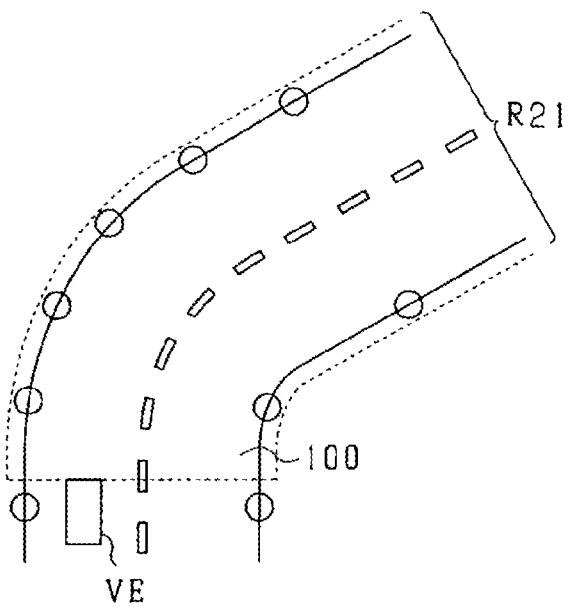
FIG. 3A is a diagram for explaining setting of a second detection area based on a road extension direction and FIG. 3B is a diagram for explaining setting of the second detection area based on a turn radius.
Figure 3B:
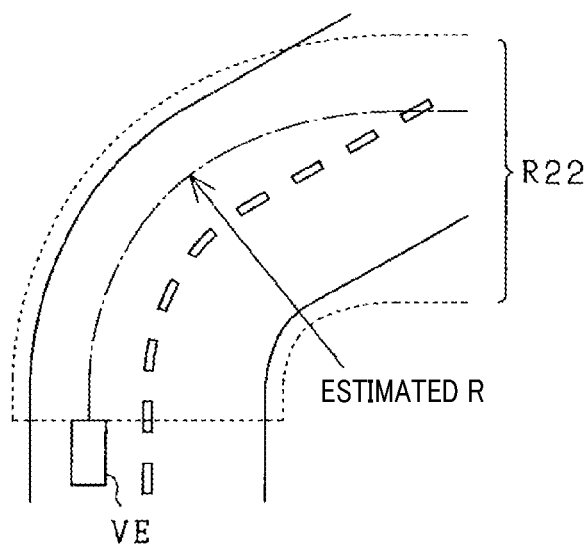

The setting of the second detection area R2 will be described with reference to FIGS. 3A and 3B. According to the present embodiment, both a road extension direction recognized from road shape information on the road 100 and a turn radius estimated during vehicle turning are used as the curved road information on the road 100, and the second detection area R2 is set based on these pieces of information. FIG. 3A is a diagram for explaining the setting of the second detection area R2 based on the road extension direction. FIG. 3B is a diagram for explaining the setting of the second detection area R2 based on the turn radius of the road 100.

In the area setting shown in FIG. 3A, the ECU 21 acquires road edge information indicating a road edge as the road shape information on the road 100 and recognizes the road extension direction by connecting pieces of the road edge information in the vertical direction. Then, an area extending along the road extension direction is set as a road extension area R21. The road edge information includes information indicating boundary lines on the road surface and road side objects, such as curbstones and guardrails. In addition, as the road shape information, white lines and center lines partitioning traffic lanes in the road can also be used. When such road shape information is acquired, a direction in which the white line or the center line extends is recognized as the road extension direction.

Furthermore, in the area setting shown in FIG. 3B, the ECU 21 calculates an estimated turn radius (estimated R) during vehicle turning by dividing the vehicle speed detected by the vehicle speed sensor 15 by the yaw rate detected by the yaw rate sensor 13. Then, an area extending along a curvature that is an inverse number of the estimated turn radius is set as a turn radius area R22.

The ECU 21 sets the second detection area R2 based on at least either of the road extension area R21 and the turn radius area R22. In this case, the ECU 21 sets the road extension area R21 as the second detection area R2 when, of the road extension area R21 and the turn radius area R22, at least the road extension area R21 is set. In addition, the ECU 21 sets the turn radius area R22 as the second detection area R2 when, of the road extension area R21 and the turn radius area R22, only the turn radius area R22 is set. An area that includes both the road extension area R21 and the turn radius area R22 can also be set as the second detection area R2.

Here, the road extension area R21 more accurately reflects the road shape than the turn radius area R22. Therefore, the road extension area R21 may be preferentially used. However, if a distance recognized in the road extension direction is less than a predetermined distance (such as 50 m), the turn radius area R22 may be used instead of the road extension area R21.

The ECU 21 detects the traffic lights in the traffic light detection area RX and selects the target traffic light to be obeyed by the own vehicle from the traffic lights detected in the traffic light detection area RX. FIG. 2 shows a state in which the road 100 is a curved road, and two traffic lights 110A and 110B are present on the road 100. In addition, as the traffic light detection area RX, an area that is substantially Y-shaped as a result of the first detection area R1 and the second detection area R2 is set. Here, in FIG. 2, a traffic light 110C is a traffic light that is present in a position that is on the front side of the own vehicle VE but off the road 100. In this case, the three traffic lights 110A to 110C are detected in the traffic light detection area RX, and the target traffic light is selected from the traffic lights 110A to 110C.

When selecting the target traffic light, the ECU 21 selects a traffic light that is detected in the first detection area R1 and the second detection area R2 in the traffic light detection area RX as the target traffic light, and does not select a traffic light that is detected in only either of the first detection area R1 and the second detection area R2 as the target traffic light. With reference to FIG. 2, of the traffic lights 110A to 110C detected in the traffic light detection area RX, the traffic light 110A is a traffic light that is detected in the first detection area R1 and the second detection area R2, and the traffic lights 110B and 110C are traffic lights detected in only either of the first detection area R1 and the second detection area R2. Therefore, whereas the traffic light 110A is selected as the target traffic light, the traffic lights 110B and 110C are not selected as the target traffic light.

Here, when the second detection area R2 is set based on the road extension area R21 and the turn radius area R22, the road extension area R21 may be a rightward-curving area and the turn radius area R22 may be a leftward-curving area. That is, orientations of the curves of the areas R21 and R22 may differ. For example, when the estimated turn radius (estimated R) is not stable, the orientations of the curves of the areas R21 and R22 differ. More specifically, a difference occurs between the areas R21 and R22 when the orientation of the own vehicle VE is temporarily leftward in a state in which the road 100 is a rightward-curved road ahead of the own vehicle. In this case, a traffic light may be not subject to elimination, even when the traffic light is outside the second detection area R2 in the traffic light detection area RX. That is, the traffic light in the first detection area R1 may be selectable as the target traffic light.

FIG. 2 shows an example of a case in which the traffic light detection area RX is set to have a substantially Y-shape when the own vehicle VE is traveling on a curved road. However, when the own vehicle VE is traveling on a straight road, the first detection area R1 and the second detection area R2 match. Therefore, the traffic light detection area RX is set to a linear area, that is, the same area as the first detection area R1. In other words, on a straight road, the road extension direction is a linear direction on the front side of the own vehicle VE. The road extension area R21 and the turn radius area R22 are both set to linear areas. Therefore, the first detection area R1 and the second detection area R2 match, and the traffic light detection area RX is set to a linear area (the same area as the first detection area R1).

Next, the setting of the lateral direction of the traffic light detection area RX will be described. A lateral width in the lateral direction of the traffic light detection area RX is set to a road width of an area including the left roadway and the right roadway of the road 100. In this case, the ECU 21 acquires the road edge information (boundary lines and roadside objects) indicating a road edge of the road 100, and calculates each of a road edge position on the left side (a left edge position of the left roadway) and a road edge position on the right side (a right edge position of the right roadway) of the road 100 based on the road edge information. In addition, the ECU 21 calculates the road width based on the left and right road edge positions, and sets the area in the lateral direction of the traffic light detection area RX based on the road width.

However, in a case in which a median strip is present in the road center, that is, between the left roadway and the right roadway of the road 100, it is thought that the median strip will become an obstacle and detection of the right road edge of the right roadway (the road edge on the far side of the opposite-direction roadway from the own vehicle VE) from the own vehicle VE will become difficult. That is, when the median strip is present in the road 100, it is thought that the median strip will be erroneously detected as the right road edge of the right roadway. Therefore, according to the present embodiment, the road width is calculated taking into consideration the presence/absence of the median strip in the road 100, and the lateral width of the traffic light detection area RX is set based on the road width. When a case in which an actual right road edge is detected on the right roadway side from the own vehicle VE and a case in which the median strip is detected are compared, distances to the detected road edge detected as the right road edge of the right roadway differ. Therefore, the distance to the detected road edge detected on the right roadway side from the own vehicle VE is calculated, and whether the detected road edge is a median strip or actually the road edge on the right roadway side is determined.

A lane width (traffic lane width) of a road is commonly about 3 to 3.5 m. If a road having two lanes on each side is assumed, for example, a distance threshold (predetermined distance DT) for determining whether the median strip is present is 12 m. In this case, the median strip is determined to be present when the distance to the detected road edge detected on the right roadway side from the own vehicle VE is shorter than 12 m. The median strip is determined to not be present when the distance is longer than 12 m. Here, the predetermined distance DT is dependent on the number of lanes in the road and the like. Therefore, lane quantity information may be acquired from map data or the like, and the predetermined distance DT may be variably set based on the number of lanes.

A specific configuration for the road width calculation will be described with reference to FIGS. 4A to 4C. Of FIGS. 4A to 4C, FIGS. 4A and 4B assume a case in which a median strip 103 is present between a left roadway 101 and a right roadway 102 on the road 100. Of the left and right road edges of the road 100, the left edge position of the left roadway 101 is a left-side road edge SL and the right edge position of the right roadway 102 is a right-side road edge SR. In addition, a boundary portion on the left roadway 101 side of the median strip 103 is a left-side boundary portion SC.

Figure 4A:
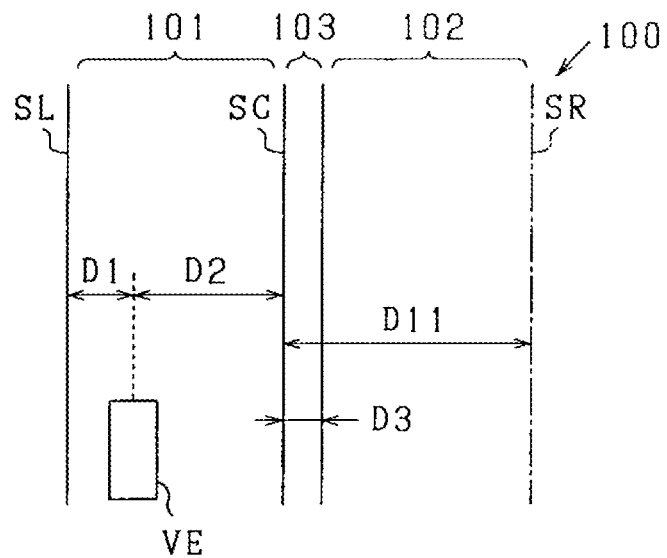
FIGS. 4A to 4C are diagrams for explaining a specific configuration for road width calculation.

In FIG. 4A, the left-side road edge SL and the left-side boundary portion SC of the median strip 103 are detected on the left roadway 101 on which the own vehicle VE travels, and the left-side boundary portion SC of the median strip 103 is the detected road edge detected on the right roadway 102 side from the own vehicle VE. In addition, a distance from a center position of the own vehicle VE to the left-side road edge SL is D1 and a distance from the center position of the own vehicle VE to the detected road edge (here, the left-side boundary portion SC of the median strip 103) detected on the right roadway 102 side is D2. In this case, based on the distance D2 being shorter than the predetermined distance DT, the ECU 21 determines that the detected road edge on the right roadway 102 side is the left-side boundary portion SC of the median strip 103.

Then, the ECU 21 sets an area composed of the lateral width of the left roadway 101 and virtual widths of the median strip 103 and the right roadway 102 as the road width, such as to expand the road width further beyond the detected road edge on the right roadway 102 side. Specifically, when the lateral widths of the left roadway 101 and the right roadway 102 are the same and the width of the median strip 103 is D3, the lateral width (D11 in FIG. 4A) of the area including the right roadway 102 and the median strip 103 is D1+D2+D3. Therefore, the road width of the road 100 is calculated as 2(D1+D2)+D3. The traffic light detection area RX is set to an area in which the left edge in the lateral direction is the left-side road edge SL, and the right edge in the lateral direction is a position shifted to the right side by a distance D2+D11 from the center position of the own vehicle VE.

Figure 4B:
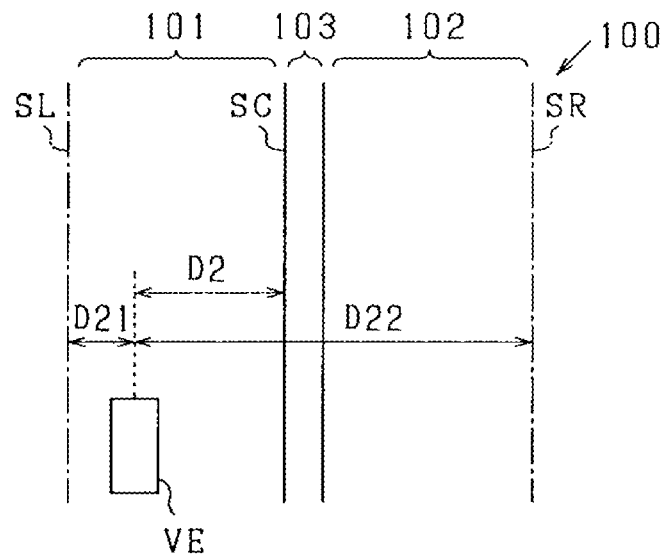

In addition, FIG. 4B is identical to FIG. 4A in that the left-side boundary portion SC of the median strip 103 is detected on the left roadway 101 on which the own vehicle VE travels and the left-side boundary portion SC is the detected road edge on the right roadway 102 side. However, FIG. 4B differs in that the left-side road edge SL is not detected. In this case, the ECU 21 determines that the detected road edge on the right roadway 102 side is the left-side boundary portion SC of the median strip 103 based on the distance to the detected road edge (here, the left-side boundary portion SC of the median strip 103) on the right roadway 102 side being shorter than the predetermined distance DT.

Then, the ECU 21 sets an area composed of an assumed distance D21 from the own vehicle center to the left-side road edge SL and an assumed distance D22 from the own vehicle center to the right-side road edge SR as the road width, such as to expand the road width further beyond the detected road edge on the right roadway 102 side. For example, the assumed distance D21 is 10 m maximum and the assumed distance D22 is 30 m maximum. These assumed distances D21 and D22 may be prescribed distances prescribed in advance or may be distances that are variably set based on the lane quantity information and inter-lane boundary line information acquired from map data, and the like. The traffic light detection area RX is set to an area in which the left edge in the lateral direction is a position shifted to the left side by the distance D21 from the center position of the own vehicle VE and the right edge in the lateral direction is a position shifted to the right side by the distance D22 from the center position of the own vehicle VE.

Figure 4C:
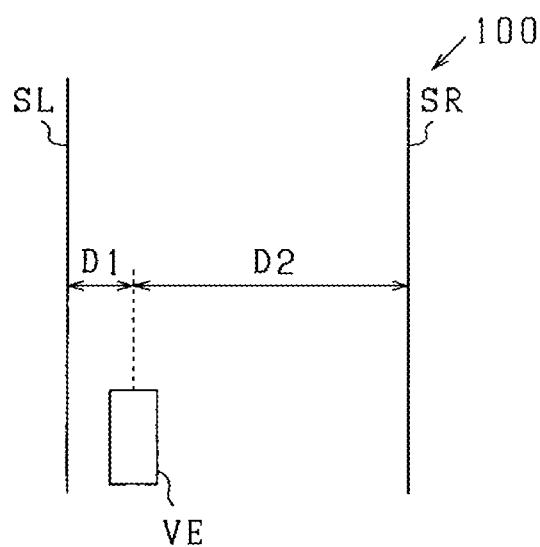

Furthermore, in FIG. 4C, the median strip 103 is not present in the road 100 on which the own vehicle VE is traveling. In this case, the ECU 21 determines that the detected road edge on the right roadway 102 side is actually the right-side road edge SR based on the distance D2 to the detected road edge on the right roadway 102 side being longer than the predetermined distance DT. Then, the ECU 21 does not expand the road width further beyond the detected road edge on the right roadway 102 side, and sets an area composed of the distance D1 from the own vehicle center to the left-side road edge SL and the distance D2 from the own vehicle center to the right-side road edge SR as the road width. The traffic light detection area RX is set to an area in which the left edge in the lateral direction is the left-side road edge SL and the right edge in the lateral direction is the right-side road edge SR.

Here, in FIG. 4C, if the left-side road edge SL is not detected, the assumed distance D21 from the own vehicle center to the left-side road edge SL may be used as the distance D1.

Although not shown in the drawings, in addition to the above-described states shown in FIGS. 4A to 4C, a case in which the road edge information on the right roadway 102 side cannot be acquired and the distance D2 to the detected road edge on the right roadway 102 side cannot be calculated is assumed. In this case, the ECU 21 may set the road width of the road 100 to a default value prescribed in advance. For example, the default value is 30 m. The traffic light detection area RX may be set to an area that is a predetermined distance D31 on the left side and a predetermined distance D32 on the right side with reference to the center position of the own vehicle VE. For example, D31+D32=30 m, and D31<D32. Alternatively, the configuration may be such that, when the road edge information on the right roadway 102 side cannot be acquired, the setting of the traffic light detection area RX is prohibited.

Figure 5:
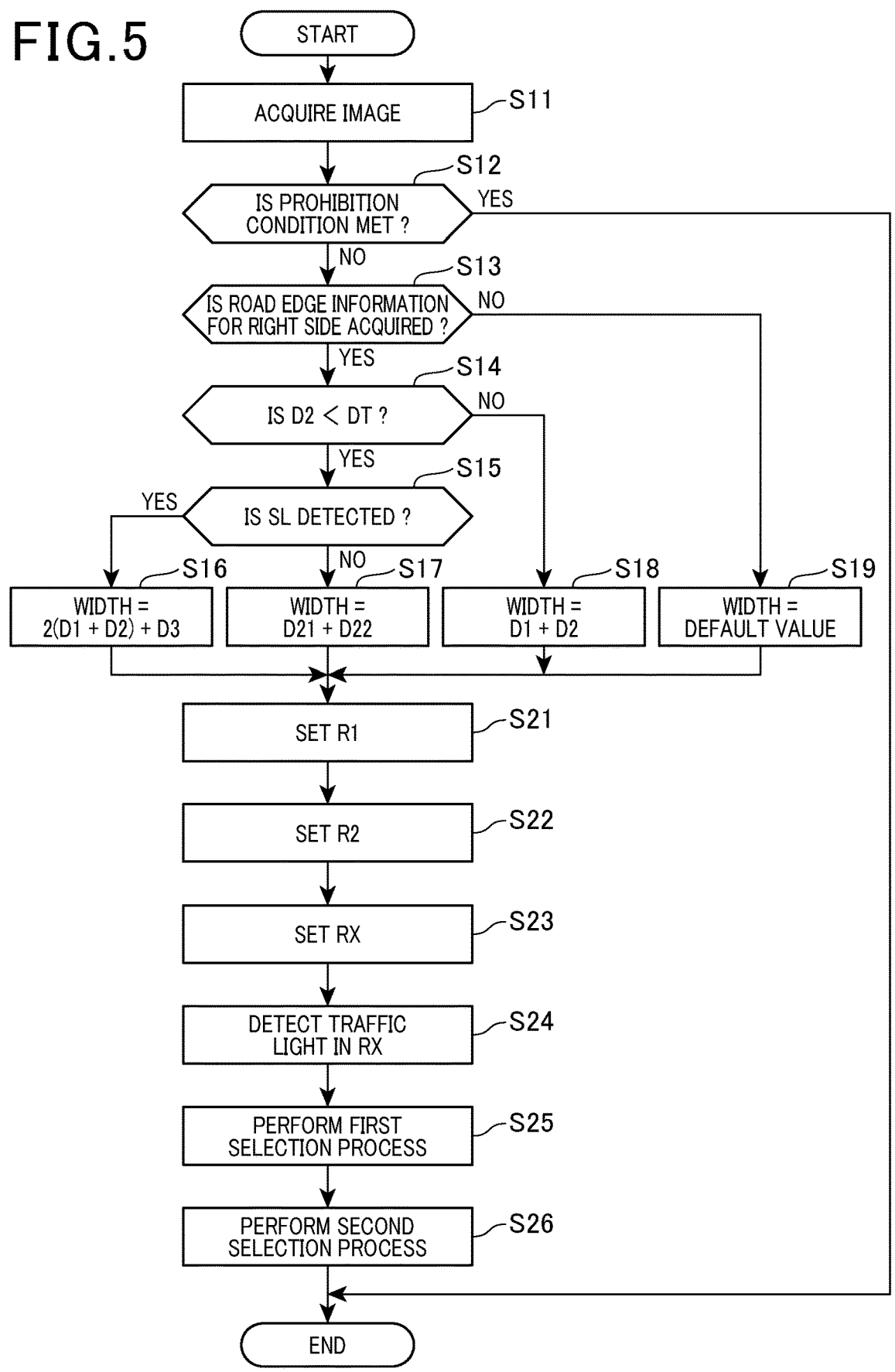
FIG. 5 is a flowchart illustrating steps in a target traffic light selection process.

FIG. 5 is a flowchart of steps in a target traffic light selection process performed by the ECU 21. The present process is repeatedly performed at a predetermined cycle by the ECU 21.

When the target traffic light selection process is started, first, the ECU 21 acquires an image of an area ahead of the own vehicle VE captured by the camera 11 (step S11). Next, the ECU 21 determines whether a prohibition condition prohibiting selection of the target traffic light is met (step S12). Details of the prohibition condition will be described hereafter. When the prohibition condition is met (YES at step S12), the ECU 21 ends the target traffic light selection process without performing the selection of the target traffic light.

Meanwhile, when the prohibition condition is not met (NO at step S12), the ECU 21 sets the traffic light detection area RX. In this case, the ECU 21 sets the lateral width of the traffic light detection area RX to an area including the left roadway 101 and the right roadway 102 of the road 100. A setting process for setting the lateral width of the traffic light detection area RX will be described below.

The ECU 21 determines whether the road edge information on the right roadway 102 side is acquired from the left roadway 101 on which the own vehicle VE is traveling (step S13). At this time, the ECU 21 makes an affirmative determination at step S13 when the road edge information on the right roadway 102 side is acquired based on the image by the camera 11 or the detection information from the radar apparatus 12, and makes a negative determination at step S13 when the road edge information is not acquired.

When the road edge information on the right roadway 102 side is acquired (YES at step S13), the ECU 21 determines whether the distance D2 from the center position of the own vehicle VE to the detected road edge on the right roadway 102 side is shorter than the predetermined distance DT (step S14). When the distance D2 is shorter than the predetermined distance DT, the detected road edge on the right roadway 102 side is determined to be a median strip. When the distance D2 is longer than the predetermined distance DT, the detected road edge on the right roadway 102 side is determined to be the right-side road edge SR rather than the median strip. When the distance D2 is shorter than the predetermined distance DT (YES at step S14), the ECU 21 determines whether the left-side road edge SL is detected (step S15).

When the left-side road edge SL is detected (YES at step S15), the ECU 21 calculates the road width of the road 100 as 2(D1+D2)+D3 (step S16). As a result, as described with reference to FIG. 4A, the road width is expanded further beyond the detected road edge on the right roadway 102 side. In addition, the road width of the road 100 is set as the lateral width of the traffic light detection area RX. Furthermore, the area in the lateral direction of the traffic light detection area RX is set to an area in which the left edge is a position shifted to the left side by the distance D1 from the own vehicle center and the right edge is a position shifted to the right side by the distance D2+D11 from the own vehicle center.

Meanwhile, when the left-side road edge SL is not detected (NO at step S15), the ECU 21 calculates the road width of the road 100 as D21+D22, based on the assumed distance D21 from the own vehicle center to the left-side road edge SL and the assumed distance D22 from the own vehicle center to the right-side road edge SR (step S17) As a result, as described with reference to FIG. 4B, the road width is expanded further beyond the detected road edge on the right roadway 102 side. In addition, the road width of the road 100 is set as the lateral width of the traffic light detection area RX. Furthermore, the area in the lateral direction of the traffic light detection area RX is set to an area in which the left edge is a position shifted to the left side by the distance D21 from the own vehicle center and the right edge is a position shifted to the right side by the distance D22 from the own vehicle center.

When the distance D2 is longer than the predetermined distance DT (NO at step S14), the ECU 21 calculates the road width of the road 100 as D1+D2, based on the distance D1 from the own vehicle center to the left-side road edge SL and the distance D2 from the own vehicle center to the right-side road edge SR (step S18). In this case, as described with reference to FIG. 4C, the road width is not expanded further beyond the detected road edge on the right roadway 102 side. In addition, the road width of the road 100 is set as the lateral width of the traffic light detection area RX. Furthermore, the area in the lateral direction of the traffic light detection area RX is set to an area in which the left edge is the left-side road edge SL and the right edge is the right-side road edge SR.

When the road edge information on the right roadway 102 side is not acquired (NO at step S13), the ECU 21 sets the road width to a default value prescribed in advance (step S19). In addition, the road width of the road 100 is set as the lateral width of the traffic light detection area RX. Furthermore, the area in the lateral direction of the traffic light detection area RX is set to an area that is the predetermined distance D31 on the left side and the predetermined distance D32 (>D31) on the right side with reference to the own vehicle center.

After the area in the lateral direction of the traffic light detection area RX is set, the ECU 21 sets the first detection area R1 prescribed to have a linear shape ahead of the own vehicle (step S21) on the front side of the own vehicle VE (step S21). At this time, the ECU 21 uses the road width calculated in the processes at steps S13 to S19 and sets an area obtained by extending the road width in the front-side direction of the own vehicle VE as the first detection area R1.

Subsequently, the ECU 21 sets the second detection area R2 ahead of the own vehicle VE, the second detection area R2 being prescribed based on the curving of the curved road based on the curved road information (step S22). At this time, as described with reference to FIGS. 3A and 3B, the second detection area R2 is set based on at least either of the road extension area R21 set using the road extension direction as the curved road information and the turn radius area R22 set using the turn radius (estimated R) as the curved road information.

More specifically, the ECU 21 recognizes the road extension direction from the road shape information of the area ahead of the own vehicle VE and sets the road extension area R21 using the road extension direction as the curved road information (see FIG. 3A). At this time, the ECU 21 uses the road width calculated in the processes at steps S13 to S19 and sets an area obtained by extending the road width in the road extension direction as the road extension area R21. In addition, the ECU 21 estimates the turn radius (estimated R) during vehicle turning based on the traveling speed and the yaw rate of the own vehicle VE, and sets the turn radius area R22 using the turn radius as the curved road information (see FIG. 3B). At this time, the ECU 21 uses the road width calculated in the processes at steps S13 to S19 and sets an area obtained by extending the road width along a curvature that is an inverse number of the turning radius as the turn radius area R22.

For example, the second detection area R2 may be set by preferentially using the road extension area R21, of the road extension area R21 and the turn radius area R21. In addition, when the distance recognized in the road extension direction is less than a predetermined distance (such as 50 m), the second detection area R2 may be set based on the turn radius area R22 instead of the road extension area R21. The second detection area R2 may be set based on an area including both the road extension area R21 and the turn radius area R22. Here, in the setting of the detection areas R1 and R2, an area that is expanded to the left and right by a predetermined distance from the road width calculated in the processes at steps S13 to S19 can also be set as the detection areas R1 and R2

Subsequently, the ECU 21 sets the traffic light detection area RX to the area including the first detection area R1 and the second detection area R2 (step S23).

After the traffic light detection area RX is set, the ECU 21 detects a traffic light present in the traffic light detection area RX (step S24).

Subsequently, the ECU 21 performs a selection process to select the target traffic light from the traffic lights in the traffic light detection area RX (steps S25 and S26). At this time, as a first selection process, the ECU 21 selects the target traffic light based on the traffic light being in the first detection area R1 or the second detection area R2 (step S25). In addition, as a second selection process, the ECU 21 performs a determination of probability regarding the traffic light in the traffic light detection area RX and selects the target traffic light based on the determination result (step S26). According to the present embodiment, two selection processes are performed. Provisional target traffic lights are selected in the first selection process, and the provisional target traffic lights are narrowed down to a final target traffic light in the second selection process.

Specifically, regarding the first selection process, the ECU 21 selects the traffic light detected in the first detection area R1 or the second detection area R2 in the traffic light detection area RX as the provisional target traffic light. However, in this case, the ECU 21 determines whether leftward/rightward curving directions are the same in the road extension area R21 and the turn radius area R22. When determined that the leftward/rightward curving directions are the same in the areas R21 and R22, the ECU 21 does not select a traffic light detected in only the first detection area R1, of the first detection area R1 and the second detection area R2, as the target traffic light.

In addition, in the second selection process, the ECU 21 performs the determination of probability regarding the provisional target traffic lights selected in the first selection process and selects the target traffic light. At this time, the ECU 21 scores the provisional traffic lights based on scoring criteria 1 to 6, described below, and selects the provisional target traffic light having a highest total score in the scoring results based on the scoring criteria 1 to 6 as the target traffic light. Here, when the total scores in the scoring results are the same for a plurality of provisional target traffic lights, the applicable plurality of provisional target traffic lights may each be selected as the target traffic light.

As the scoring criterion 1, the ECU 21 determines an orientation of the provisional target traffic light in relation to the own vehicle and scores the provisional target traffic light based on the determination result. Specifically, the provisional target traffic light having a higher degree of facing the own vehicle VE has a higher score. That is, the provisional target traffic light that faces the own vehicle VE is given the highest score based on the scoring criterion 1. The provisional target traffic light that is oriented such that a display color of the traffic light is not visible from the own vehicle VE is given a low score based on the scoring criterion 1.

As the scoring criterion 2, the ECU 21 detects the display color of the traffic light, determines that the display color is a prescribed color prescribed in advance, and scores the provisional target traffic light based on the determination result. Specifically, the ECU 21 performs a process to detect the display color of the traffic light at a fixed cycle. The score is increased by 1 for the provisional target traffic light in which red is detected as the prescribed color, and the score is increased by 3 for the provisional target traffic light in which green is detected. In addition, a counter may be increased by 1 each time red is detected as the prescribed color. The counter may be increased by 3 each time green is detected. The provisional target traffic light may be scored under a condition that a total of the counter is equal to or greater than a predetermined value.

As the scoring criterion 3, the ECU 21 scores the provisional target traffic light based on whether the provisional target traffic light is detected a threshold number of times or more. Specifically, the ECU 21 performs a process to detect the provisional target traffic light at a fixed cycle and scores the traffic light that is continuously detected the threshold number of times or more.

As the scoring criterion 4, the ECU 21 scores the provisional target traffic light based on a detection reliability level. Specifically, the ECU 21 performs a process to detect the provisional target traffic light at a fixed cycle. A shape detected as the provisional target traffic light and a traffic light shape of a sample included in collation data are compared, and the provisional target traffic light having a higher degree of similarity is given a higher score.

As the scoring criterion 5, the ECU 21 scores the provisional target traffic light based on height from a ground surface. Specifically, the provisional target traffic light of which the height from the ground surface is within a predetermined range is scored. The provisional target traffic light of which the height from the ground surface is below a lower limit of the predetermined range is highly likely to be a pedestrian traffic light. The scoring criterion 5 prevents such traffic lights from being scored.

As the scoring criterion 6, the ECU 21 scores the provisional target traffic light based on a number of shapes indicating a light position. Specifically, the provisional target traffic light in which three or more circular shapes that are the shapes indicating the light positions are detected is scored. For example, the provisional target traffic light in which two circular shapes indicating the light positions are detected is highly likely to be an advanced-warning traffic light. The scoring criterion 6 prevents such traffic lights from being scored.

In the second selection process, the ECU 21 selects the provisional target traffic light having the highest total score in the scoring result based on the above-described scoring criteria 1 to 6 as the target traffic light. The position and the display color of the traffic light selected as the target traffic light is displayed in the display 31. In addition, based on the display color of the traffic light, the ECU 21 may perform brake control or accelerator control as driving assistance.

Next, the prohibition condition determined to be met at step S12 in the target traffic light selection process in FIG. 5 will be described. When at least one of requirements 1 to 7 described below is met, the prohibition condition is determined to be met.

As the requirement 1, a distance of forward travel from when a starter switch that starts the own vehicle VE is turned on being less than a predetermined distance can be given.

As the requirement 2, at least one of a distance of forward travel after the own vehicle VE retreats being less than a predetermined distance, the vehicle speed detected by the vehicle speed sensor 15 not exceeding a predetermined vehicle speed, and a white line not being detected in the image captured by the camera 11 being met can be given. As a case in which the own vehicle VE retreats, a case in which the own vehicle VE is traveling inside a parking area is assumed.

As the requirement 3, at least one of a distance of forward travel after the own vehicle VE travels at a turn radius smaller than a predetermined radius being less than a predetermined distance, the vehicle speed detected by the vehicle speed sensor 15 not exceeding a predetermined vehicle speed, and a white line on a road not being detected in the image captured by the camera 11 being met can be given. Here, as a case in which the own vehicle VE travels at a turn radius smaller than the predetermined radius, traveling so as to turn when entering a roadway from a parking area is assumed. Therefore, as the predetermined radius, a value greater than the turn radius assumed when a roadway is entered from a parking area is set.

As the requirement 4, the vehicle speed detected by the vehicle speed sensor 15 being equal to or greater than a vehicle speed at which a vehicle is considered to be traveling on an expressway can be given.

As the requirement 5, when the driving assistance apparatus 10 has position information indicating a position of an intersection, a distance of forward travel after a left or right turn within an intersection being less than a predetermined distance can be given.

As the requirement 6, when the driving assistance apparatus 10 has disposal information on traffic lights, the own vehicle VE traveling on a road on which a traffic light is not disposed can be given.

As the requirement 7, when the driving assistance apparatus 10 has information indicating correspondence between a traffic light and a position of a traffic lane in which the display on the traffic light is to be obeyed, the own vehicle VE traveling on a traffic lane differing from the applicable traffic lane can be given.

When any of the requirements 1 to 7 is met, the ECU 21 does not perform selection of the target traffic light by not performing processes subsequent to the setting (steps S13 to S19) of the lateral width of the traffic light detection area RX. In this case, the ECU 21 determines that the own vehicle VE is in a state of being in a parking area based on the requirements 1 to 3, and based on this determination, prohibits selection of the target traffic light. Here, the requirement 3 determines that the own vehicle VE is moving out onto a road from the parking area. The ECU 21 may prohibit selection of the target traffic light during determination of this state as well.

According to the embodiment described above, the following excellent effects can be achieved.

The vehicle control apparatus according to the present embodiment sets the traffic light detection area RX in which a traffic light present ahead of the own vehicle VE is detected in an image captured by the camera 11, based on the form of the road. The vehicle control apparatus selects the target traffic light to be obeyed by the own vehicle VE from the traffic lights detected in the traffic light detection area RX. In this case, the traffic light detection area RX can be appropriately set while taking into consideration the form of the road at each time. Furthermore, the target traffic light can be correctly recognized from the traffic lights captured in the image.

In addition, the traffic light detection area RX is set to an area including the first detection area R1 prescribed in a linear shape ahead of the own vehicle VE on the front side of the own vehicle VE and the second detection area R2 prescribed ahead of the own vehicle VE based on the curving of the curved road based on the curved road information. As a result of a configuration such as this, the detection area can be set not only in the direction to the front of the own vehicle VE but also in the direction of the curve. Therefore, the traffic lights present on a straight road and a curved road can be appropriately recognized while also assuming curved roads in addition to straight roads. Consequently, traffic light recognition adhering to diverse road forms can be obtained.

Furthermore, the second detection area R2 is set based on at least either of the road extension area R21 set using the road extension direction as the curved road information and the turn radius area R22 set using the turn radius as the curved road information. If the road extension direction is recognized from the road shape information of the area ahead of the own vehicle VE, the second detection area R2 can be appropriately set adhering to the advancing direction in which the own vehicle VE will subsequently advance. In addition, because the second detection area R2 can also be set using the turn radius estimated based on the traveling speed and the yaw rate of the own vehicle VE, the second detection area R2 can be accurately set based on information on at least either of the road extending direction and the turn radius.

Moreover, in the traffic light detection area RX, the traffic light detected in the first detection area R1 and the second detection area R2 is selected as the target traffic light, and the traffic light detected in only either of the first detection area R1 and the second detection area R2 is not selected as the target traffic light. As a result of a configuration such as this, when the traffic light to be obeyed by the own vehicle is selected, the traffic light detected in only either of the first detection area R1 and the second detection area R2 can be eliminated from the selection. Therefore, the target traffic light can be appropriately selected.

In addition, the area including the left roadway 101 (forward-direction roadway) and the right roadway 102 (opposite-direction roadway) of the road 100 is set as the lateral width of the traffic light detection area RX. The target traffic light may be present not only on the left roadway 101 but also on the right roadway 102 that is in the opposite direction. In this regard, because the area including the left and right roadways 101 and 102 is set as the lateral width of the traffic light detection area RX, and the target traffic light is selected from the traffic lights detected in the traffic light detection area RX, the target traffic light can be appropriately selected from the image captured by the camera 11.

Furthermore, when the distance from the own vehicle VE to the detected road edge on the right roadway 102 side is shorter than the predetermined distance DT, the detected road edge is considered to be the median strip. The lateral width of the traffic light detection area RX is set such that the road width is expanded further beyond the detected road edge. When the distance from the own vehicle VE to the detected road edge is longer than the predetermined distance DT, the lateral width of the traffic light detection area RX is set without the road width being expanded beyond the detected road edge. As a result, even when detection of the road edge on the side far from the own vehicle VE is difficult as a result of the median strip in the road becoming an obstacle, the traffic light detection area RX can be appropriately set, and further, the target traffic light can be favorably selected.

In addition, the orientation of the traffic light in relation to the own vehicle VE is determined and the target traffic light is selected based on the determination result. At an intersection or the like, because the own vehicle VE enters from a plurality of directions, the orientation of the traffic light is prescribed in correspondence to each direction of entry of the own vehicle VE. In this case, regarding the traffic lights included in the traffic light detection area RX, as a result of the target traffic light being selected based on the determination result of the orientation in relation to the own vehicle VE, reliability of selection of the target traffic light can be improved.

Furthermore, the display color of the traffic light is detected. The display light being a prescribed color is determined. The target traffic light is selected based on the determination result. At an intersection or the like, a light emitting apparatus, such as an advanced-warning traffic light or a street light, may be provided in addition to the traffic lights for displaying advancement and stopping of the own vehicle VE. The advanced-warning traffic light, the street light, and the like being detected mistakenly for the traffic light is a concern. In this regard, the display color of the traffic light being a prescribed color prescribed in advance is determined, and the target traffic light is selected based on the determination results regarding the display colors of the traffic lights included in the traffic light detection area RX. As a result, reliability of selection of the target traffic light can be improved.

Moreover, when the own vehicle VE is determined to be in a state of being in a parking area, selection of the target traffic light is not performed. When the own vehicle VE is in the parking area, even when the traffic light is recognized in the direction to the front of the own vehicle, the traffic light is thought to not be the target traffic light. In this case, when the selection process for the traffic light similar to that during ordinary road traveling is performed in a state in which the own vehicle is in the parking area, the target traffic light may be erroneously selected and unnecessary processes may be performed as a result of the selection result. In this regard, selection of the target traffic light is not performed when the own vehicle is determined to be in a state of being in a parking area. Consequently, the target traffic light being erroneously selected, and unnecessary processing resulting from the selection process being performed can be suppressed.

Second Embodiment

According to a second embodiment, differences with the first embodiment will be described. According to the second embodiment, in the second selection process, another configuration will be described as the configuration for selecting the target traffic light from the provisional target traffic lights.

Figure 6:
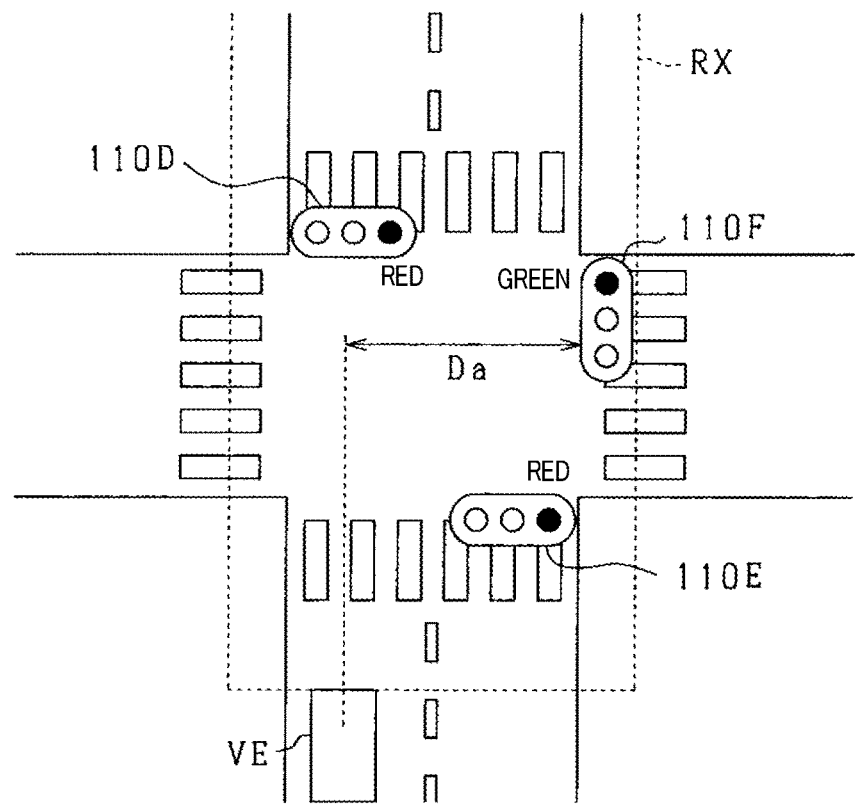
FIG. 6 is a diagram illustrating an intersection including a plurality of traffic lights.

In FIG. 6, at an intersection, a traffic light 110D provided in front of the own vehicle VE and toward the back of the intersection, a traffic light 110E provided in front of the own vehicle VE and toward the front of the intersection, and a traffic light 110F provided for an intersecting road intersecting a straight-ahead direction of the own vehicle VE are present. In this case, because the traffic lights 110D, 110E, and 110F are included in the traffic light detection area RX set by the own vehicle VE, the traffic lights 110D to 110F are selected as the provisional target traffic lights. Of the traffic lights 110D to 110F, the traffic light 110F for the intersecting road has a greater lateral distance Da (distance in the lateral direction) to the own vehicle VE than the other traffic lights. In addition, the display color of the traffic light 110D and the display color of the traffic light 110E are the same. The display color of the traffic lights 110D and 110E and the display color of the traffic light 110F differ. In FIG. 6, the display color of the traffic lights 110D and 110E is red and the display color of the traffic light 110F is green.

When the plurality of traffic lights 110D to 110F that are present within the same intersection and have differing display colors are included as the provisional target traffic lights, of the plurality of traffic lights 110D to 110F, the ECU 21 excludes the traffic light 110F of which the lateral distance to the own vehicle VE is equal to or greater than the predetermined distance and of which the display color differs from that of the traffic lights 110D and 110E on the front side of the own vehicle VE, from the selection of the target traffic light. As a result, of the traffic lights 110D to 110F, the traffic lights 110D and 110E are selected as the target traffic lights. The configuration may also be such that, of the traffic lights 110D and 110E, the traffic light 110D that is closer to the front side of the own vehicle VE is selected as the target traffic light. Here, the display color used as reference for selection at this time is red and green. Yellow is not used in the selection of the target traffic light.

At an intersection, respective traffic lights for the roads that intersect each other being included as the traffic lights can be considered. However, the traffic light among the plurality of traffic lights that is the target traffic light of the own vehicle VE is required to be accurately recognized. In this regard, as a result of the above-described configuration, the target traffic light of the own vehicle VE can be appropriately recognized.

Figure 7:
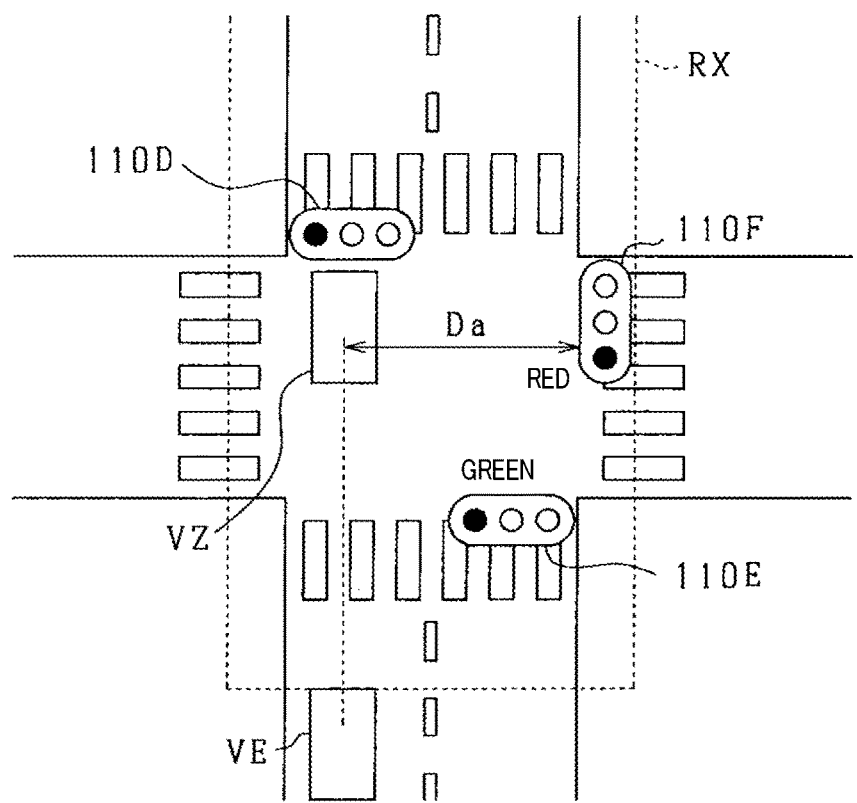
FIG. 7 is a diagram illustrating an intersection including a plurality of traffic lights.

In addition, as a result of a configuration below, the target traffic light can be selected from provisionary target traffic lights in the second selection process. In FIG. 7, in a manner similar to that in FIG. 6, the traffic lights 110D to 110F are present at an intersection. The traffic lights 110D to 110F are included in the traffic light detection area RX and are therefore selected as the provisionary target traffic lights. The display color of the traffic light 110D and the display color of the traffic light 110E are the same. The display color of the traffic lights 110D and 110E and the display color of the traffic light 110F differ. In FIG. 7, the display color of the traffic lights 110D and 110E is green, and the display color of the traffic light 110F is red. Furthermore, within the intersection, a leading vehicle VZ is traveling ahead of the own vehicle VE.

Here, within the intersection, in a state in which the traffic light 110D is selected as the target traffic light, a case in which the traffic light 110D is lost as a result of being hidden by the leading vehicle VZ that has a high vehicle height is assumed. In this case, of the remaining traffic lights 110E and 110F that are detected within the same intersection, the ECU 21 eliminates the traffic light 110F that has the display color differing from that of the lost traffic light 110D (target traffic light) and of which the lateral distance Da to the own vehicle VE is equal to or greater than a predetermined distance. As a result, of the traffic lights 110E and 110F, the traffic light 110E is selected as the target traffic light. Here, the configuration may be such that, when the traffic light 110D is in the lost state, if the display colors of the remaining traffic lights 110E and 110F within the same intersection differ, and the lateral distance Da of the traffic light 110F be equal to or greater than the predetermined distance, the traffic light 110F is eliminated from the selection of the target traffic lights.

As a result of the above-described configuration, even when the target traffic light in front of the own vehicle VE is in the lost state within the intersection, the target traffic light of the own vehicle VE can be continuously accurately recognized.

For example, the above-described embodiments may be modified in the following manner.

According to the above-described first embodiment, the description is given assuming left-hand traffic. However, this is not limited thereto. For example, the vehicle control apparatus of the present disclosure may be applied to roads with right-hand traffic. In roads with right-hand traffic, the right roadway on the right side is the forward-direction roadway of which the travel-permitted direction is the same as the advancing direction of the own vehicle, and the left roadway on the left side is the opposite-direction roadway of which the travel-permitted direction is the opposite direction of the forward-direction roadway. The vehicle control apparatus of the present disclosure can also be applied to this road.

A following process may be performed as the first selection process (step S25) described in the target traffic light selection process in FIG. 5. The ECU 21 selects the traffic light detected in the first detection area R1 and the second detection area R2 in the traffic light detection area RX as the provisional target traffic light, and does not select the traffic light detected in only either of the first detection area R1 and the second detection area R2 as the provisional target traffic light. In this case, the target traffic light is selected by the first selection process (step S25) and the second selection process (Step S26) being performed. However, this is not limited thereto. For example, the target traffic light may be selected by only either of the first selection process (step S25) and the second selection process (step S26) being performed.

According to the first embodiment described above, the provisional target traffic light of which the total score in the scoring results based on the scoring criteria 1 to 6 is the highest is selected as the target traffic light. However, this is not limited thereto. For example, the provisional target traffic light may be scored based on at least one or more scoring criteria, and the provisional target traffic light having the highest total score in the scoring results may be selected as the target traffic light.

According to the above-described first embodiment, when the requirement 3 is met, the ECU 21 does not perform the processes subsequent to the setting of the lateral width of the traffic light detection area RX (steps S13 to S19), and thereby does not perform selection of the target traffic light. However, this is not limited thereto. For example, when the requirement 3 is met, the ECU 21 may perform the processes for setting the lateral width of the traffic light detection area RX (steps S13 to S19) and setting the traffic light detection area RX (steps S21 to S24), and then detect the traffic lights included within a predetermined range from the own vehicle VE in the traffic light detection area RX as the provisional target traffic lights. That is, the traffic lights that are positioned farther than the predetermined range in the traffic light detection area RX may not be detected as the provisional target traffic light. As a result, even in a state immediately after the own vehicle VE travels at a smaller turn radius than a predetermined radius and enters a roadway from a parking area (a state in which the requirement 3 is met), the traffic light included within the predetermined range from the own vehicle VE can be detected as the provisional target traffic light.

The control unit and the method thereof described in the present disclosure may be implemented by a dedicated computer that is provided such as to be configured by a processor and a memory, the processor being programmed to provide one or a plurality of functions that are realized by a computer program. Alternatively, the control unit and the method thereof described in the present disclosure may be implemented by a dedicated computer that is provided by a processor being configured by a single dedicated hardware logic circuit or more. Still alternatively, the control unit and the method thereof described in the present disclosure may be implemented by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer readable (tangible) storage medium that can be read by a computer as instructions performed by the computer.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A vehicle control apparatus that recognizes traffic conditions ahead of an own vehicle based on an image captured by a camera that captures an area ahead of the own vehicle, the vehicle control apparatus comprising:
   a detection area setting unit that sets a traffic light detection area in which a traffic light present ahead of the own vehicle is detected in the image, based on a form of a road;
   a selecting unit that selects a target traffic light to be obeyed by the own vehicle from traffic lights detected in the traffic light detection area;
   a recognizing unit that recognizes a road extension direction from road shape information on the area ahead of the own vehicle;
   an estimating unit that estimates a turn radius during vehicle turning based on a traveling speed and a yaw rate of the own vehicle; and
   a curve direction determining unit that determines whether directions of left/right curves of a road extension area and a turn radius area are the same, the road extension area being set using the road extension direction recognized by the recognizing unit as the curved road information, the turn radius area being set using the turn radius estimated by the estimating unit as the curved road information, wherein
   the detection area setting unit sets the traffic light detection area to an area including a first detection area prescribed in a linear shape ahead of the own vehicle on a front side of the own vehicle, and a second detection area prescribed ahead of the own vehicle based on curving of a curved road based on curved road information, and sets the second detection area based on at least either of the road extension area and the turn radius area, and
   the selecting unit does not select the traffic light detected in only the first detection area of the first detection area and the second detection area as the target traffic light, in response to the directions of the left/right curves of the road extension area and the turn radius area being determined to be the same.

2. The vehicle control apparatus according to claim 1, wherein:
   the selecting unit selects the traffic light detected in the first detection area and the second detection area in the traffic light detection area as the target traffic light, and does not select the traffic light detected in only either of the first detection area and the second detection area as the target traffic light.

3. The vehicle control apparatus according to claim 2, wherein:
   the detection area setting unit sets an area including a forward-direction roadway of which a travel-permitted direction is identical to an advancing direction of the own vehicle and an opposite-direction roadway of which the travel-permitted direction is an opposite direction of the forward-direction roadway on a road on which the own vehicle is traveling as a lateral width of the traffic light detection area.

4. The vehicle control apparatus according to claim 3, comprising:
   a road edge detecting unit that detects, of left and right road edges in a road-width direction, the road edge on the opposite-direction roadway side as a detected road edge, wherein
   the detection area setting unit
      sets the detected road edge to be a median strip when a distance from the own vehicle to the detected road edge is shorter than a predetermined distance, and sets the lateral width of the traffic light detection area such that a road width is expanded further beyond the detected road edge, and
      when the distance from the own vehicle to the detected road edge is longer than the predetermined distance, sets the lateral width of the traffic light detection area without expanding the road width.

5. The vehicle control apparatus according to claim 1, wherein:
   the detection area setting unit sets an area including a forward-direction roadway of which a travel-permitted direction is identical to an advancing direction of the own vehicle and an opposite-direction roadway of which the travel-permitted direction is an opposite direction of the forward-direction roadway on a road on which the own vehicle is traveling as a lateral width of the traffic light detection area.

6. The vehicle control apparatus according to claim 5, comprising:
   a road edge detecting unit that detects, of left and right road edges in a road-width direction, the road edge on the opposite-direction roadway side as a detected road edge, wherein
   the detection area setting unit
      sets the detected road edge to be a median strip when a distance from the own vehicle to the detected road edge is shorter than a predetermined distance, and sets the lateral width of the traffic light detection area such that a road width is expanded further beyond the detected road edge, and
      when the distance from the own vehicle to the detected road edge is longer than the predetermined distance, sets the lateral width of the traffic light detection area without expanding the road width.

7. The vehicle control apparatus according to claim 1, wherein:
   in response to the target traffic light being lost in a state in which the target traffic light is selected within an intersection, the selecting unit does not select, among the remaining traffic lights detected within the same intersection, the traffic light of which the display color differs from that of the lost target traffic light and a distance in a lateral direction to the own vehicle is equal to or greater than a predetermined distance, as the target traffic light.

8. The vehicle control apparatus according to claim 1, comprising:
   a state determining unit that determines that the own vehicle is in a state of being in a parking area, wherein in response to the state determining unit determining that the own vehicle is in the state of being in a parking area, the selecting unit does not perform selection of the target traffic light.

9. The vehicle control apparatus according to claim 1, comprising:
an orientation determining unit that determines an orientation of a traffic light to the own vehicle, wherein
the selecting unit selects the target traffic light from the traffic lights detected in the traffic light detection area based on a determination result from the orientation determining unit.

10. The vehicle control apparatus according to claim 1, comprising:
a color determining unit that detects a display color of the traffic light and determines that the display color is a prescribed color prescribed in advance, wherein
the selecting unit selects the target traffic light from the traffic lights detected in the traffic light detection area based on a determination result from the color determining unit.

11. The vehicle control apparatus according to claim 1, wherein:
when a plurality of traffic lights present within a same intersection and of which display colors differ are included as the traffic lights detected in the traffic light detection area, the selecting unit does not select, among the plurality of traffic lights, the traffic light of which a distance in a lateral direction to the own vehicle is equal to or greater than a predetermined distance and the display color differs from that of a traffic light on a front side of the own vehicle, as the target traffic light.

12. A vehicle control apparatus that recognizes traffic conditions ahead of an own vehicle based on an image captured by a camera that captures an area ahead of the own vehicle, the vehicle control apparatus comprising:
a detection area setting unit that sets a traffic light detection area in which a traffic light present ahead of the own vehicle is detected in the image, based on a form of a road;
a selecting unit that selects a target traffic light to be obeyed by the own vehicle from traffic lights detected in the traffic light detection area; and
a road edge detecting unit that detects, of left and right road edges in a road-width direction, the road edge on the opposite-direction roadway side as a detected road edge, wherein
the detection area setting unit
sets an area including a forward-direction roadway of which a travel-permitted direction is identical to an advancing direction of the own vehicle and an opposite-direction roadway of which the travel-permitted direction is an opposite direction of the forward-direction roadway on a road on which the own vehicle is traveling as a lateral width of the traffic light detection area,
in response to a distance from the own vehicle to the detected road edge being shorter than a predetermined distance, sets the detected road edge to be a median strip, and sets the lateral width of the traffic light detection area such that a road width is expanded further beyond the detected road edge, and
in response to the distance from the own vehicle to the detected road edge being longer than the predetermined distance, sets the lateral width of the traffic light detection area without expanding the road width.

13. The vehicle control apparatus according to claim 12, wherein:
in response to the target traffic light being lost in a state in which the target traffic light is selected within an intersection, the selecting unit does not select, among the remaining traffic lights detected within the same intersection, the traffic light of which the display color differs from that of the lost target traffic light and a distance in a lateral direction to the own vehicle is equal to or greater than a predetermined distance, as the target traffic light.

14. The vehicle control apparatus according to claim 13, comprising:
a state determining unit that determines that the own vehicle is in a state of being in a parking area, wherein
in response to the state determining unit determining that the own vehicle is in the state of being in a parking area, the selecting unit does not perform selection of the target traffic light.

15. A vehicle control apparatus that recognizes traffic conditions ahead of an own vehicle based on an image captured by a camera that captures an area ahead of the own vehicle, the vehicle control apparatus comprising:
a detection area setting unit that sets a traffic light detection area in which a traffic light present ahead of the own vehicle is detected in the image, based on a form of a road; and
a selecting unit that selects a target traffic light to be obeyed by the own vehicle from traffic lights detected in the traffic light detection area, wherein
in response to the target traffic light being lost in a state in which the target traffic light is selected within an intersection, the selecting unit does not select, among the remaining traffic lights detected within the same intersection, the traffic light of which the display color differs from that of the lost target traffic light and a distance in a lateral direction to the own vehicle is equal to or greater than a predetermined distance, as the target traffic light.

16. The vehicle control apparatus according to claim 15, comprising:
a state determining unit that determines that the own vehicle is in a state of being in a parking area, wherein
in response to the state determining unit determining that the own vehicle is in the state of being in a parking area, the selecting unit does not perform selection of the target traffic light.

17. A vehicle control apparatus that recognizes traffic conditions ahead of an own vehicle based on an image captured by a camera that captures an area ahead of the own vehicle, the vehicle control apparatus comprising:
a detection area setting unit that sets a traffic light detection area in which a traffic light present ahead of the own vehicle is detected in the image, based on a form of a road;
a selecting unit that selects a target traffic light to be obeyed by the own vehicle from traffic lights detected in the traffic light detection area; and
a state determining unit that determines that the own vehicle is in a state of being in a parking area, wherein
in response to the state determining unit determining that the own vehicle is in the state of being in a parking area, the selecting unit does not perform selection of the target traffic light.

18. The vehicle control apparatus according to claim 17, comprising:

an orientation determining unit that determines an orientation of a traffic light to the own vehicle, wherein
the selecting unit selects the target traffic light from the traffic lights detected in the traffic light detection area based on a determination result from the orientation determining unit.

19. The vehicle control apparatus according to claim 18, comprising:
a color determining unit that detects a display color of the traffic light and determines that the display color is a prescribed color prescribed in advance, wherein
the selecting unit selects the target traffic light from the traffic lights detected in the traffic light detection area based on a determination result from the color determining unit.

20. The vehicle control apparatus according to claim 19, wherein:
when a plurality of traffic lights present within a same intersection and of which display colors differ are included as the traffic lights detected in the traffic light detection area, the selecting unit does not select, among the plurality of traffic lights, the traffic light of which a distance in a lateral direction to the own vehicle is equal to or greater than a predetermined distance and the display color differs from that of a traffic light on a front side of the own vehicle, as the target traffic light.

* * * * *